US012294157B2

(12) United States Patent
Yang et al.

(10) Patent No.: US 12,294,157 B2
(45) Date of Patent: May 6, 2025

(54) DUAL-FREQUENCY ANTENNA AND ELECTRONIC DEVICE

(71) Applicants: Beijing BOE Sensor Technology Co., Ltd., Beijing (CN); BOE TECHNOLOGY GROUP CO., LTD., Beijing (CN)

(72) Inventors: Xiaoqiang Yang, Beijing (CN); Zhifeng Zhang, Beijing (CN); Yiming Wang, Beijing (CN); Cuiwei Tang, Beijing (CN); Wei Zhao, Beijing (CN); Lu Chen, Beijing (CN); Zixiang Lin, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/025,682

(22) PCT Filed: Jun. 15, 2022

(86) PCT No.: PCT/CN2022/098865

§ 371 (c)(1),
(2) Date: Mar. 10, 2023

(87) PCT Pub. No.: WO2023/240481

PCT Pub. Date: Dec. 21, 2023

(65) Prior Publication Data

US 2024/0291169 A1 Aug. 29, 2024

(51) Int. Cl.

*H01Q 21/30* (2006.01)
*H01Q 3/36* (2006.01)

(Continued)

(52) U.S. Cl.

CPC ............... *H01Q 21/30* (2013.01); *H01Q 3/36* (2013.01); *H01Q 5/321* (2015.01); *H01Q 15/14* (2013.01); *H01Q 21/065* (2013.01)

(58) Field of Classification Search

CPC H01Q 1/36; H01Q 1/38; H01Q 15/00; H01Q 15/0006; H01Q 15/14; H01Q 3/36;

(Continued)

(56) References Cited

U.S. PATENT DOCUMENTS 6,552,687 B1 * 4/2003 Rawnick .............. H01Q 21/062 343/848
2013/0285858 A1 * 10/2013 Grange ............... H01F 10/3218 343/700 MS (Continued)

FOREIGN PATENT DOCUMENTS

CN 1618144 A 5/2005
CN 106099341 A 11/2016

(Continued)

OTHER PUBLICATIONS

Wu et al., "Dual-Frequency Microstrip Reflectarray," Conference paper, 1995 Digest, pp. 2128-2131, IEEE Antennas and Propagation Society International Symposium.

*Primary Examiner* — Thai Pham
(74) *Attorney, Agent, or Firm* — HOUTTEMAN LAW LLC

(57) ABSTRACT

A dual-frequency antenna and an electronic device are provided, and belong to the field of communication technology. The dual-frequency antenna includes a first antenna unit and a second antenna unit opposite to each other, and a filtering unit therebetween. An operating frequency band of the first antenna unit is a first frequency band; an operating frequency band of the second antenna unit is a second frequency band; the filtering unit is configured to reflect an electromagnetic wave of the first frequency band and to (Continued)

transmit an electromagnetic wave of the second frequency band; the first antenna unit is configured to receive the electromagnetic wave of the first frequency band and to reflect the received electromagnetic wave of the first frequency band by the filtering unit; and the second antenna unit is configured to receive and reflect the electromagnetic wave of the second frequency band transmitted by the filtering unit.

18 Claims, 5 Drawing Sheets

(51) Int. Cl.

| | |
|---|---|
| ***H01Q 5/321*** | (2015.01) |
| ***H01Q 15/14*** | (2006.01) |
| ***H01Q 21/06*** | (2006.01) |

(58) Field of Classification Search

CPC ...... H01Q 21/00; H01Q 21/065; H01Q 21/24; H01Q 21/30; H01Q 5/321

See application file for complete search history.

(56) References Cited

U.S. PATENT DOCUMENTS

| | | | | |
|---|---|---|---|---|
| 2019/0165450 | A1* | 5/2019 | Ji | H01Q 5/42 |
| 2021/0249771 | A1 | 8/2021 | Schuss et al. | |
| 2022/0239008 | A1* | 7/2022 | Luo | H01Q 1/521 |

FOREIGN PATENT DOCUMENTS

| | | | |
|---|---|---|---|
| CN | 106911001 | A | 6/2017 |
| CN | 107046176 | A | 8/2017 |
| CN | 110600886 | A | 12/2019 |
| CN | 110896678 | A | 3/2020 |
| CN | 112688052 | A | 4/2021 |
| CN | 113258265 | A | 8/2021 |
| CN | 113381193 | A | 9/2021 |
| CN | 215184541 | U | 12/2021 |
| CN | 114361810 | A | 4/2022 |
| TW | M 428595 | U | 5/2012 |
| WO | WO 2012080532 | A1 | 6/2012 |

* cited by examiner

DUAL-FREQUENCY ANTENNA AND ELECTRONIC DEVICE

TECHNICAL FIELD

The present disclosure relates to the field of communication technology, and in particular to a dual-frequency antenna and an electronic device.

BACKGROUND

In a scene of satellite communication or the like, a transmitting antenna and a receiving antenna usually operate at different frequencies. In order to simplify the system and reduce the cost, the antenna is required to include a transmitting-receiving common aperture. That is, the antenna is suitable for double-frequency operation. The existing dual-frequency reflective array antenna can only realize a fixed-beam pointing and cannot realize a beam scanning. Thus, the technical problem to be solved urgently is to provide a dual-frequency antenna capable of realizing the beam scanning.

SUMMARY

The present invention is directed to at least one of the technical problems of the prior art, and provides a dual-frequency antenna and an electronic device.

In a first aspect, an embodiment of the present disclosure provides a dual-frequency antenna, including a first antenna unit and a second antenna unit opposite to each other, and a filtering unit between the first antenna unit and the second antenna unit; wherein an operating frequency band of the first antenna unit is a first frequency band; an operating frequency band of the second antenna unit is a second frequency band; the filtering unit is configured to reflect an electromagnetic wave of the first frequency band and to transmit an electromagnetic wave of the second frequency band; the first antenna unit is configured to receive the electromagnetic wave of the first frequency band, which is then reflected by the filtering unit; and the second antenna unit is configured to receive the electromagnetic wave of the second frequency band transmitted by the filtering unit and to reflect the electromagnetic wave of the second frequency band.

In some embodiments, the first antenna unit includes at least one first sub-array; the second antenna unit includes at least one second sub-array; each first sub-array includes a first dielectric substrate and a second dielectric substrate opposite to each other, a first phase adjusting structure between the first dielectric substrate and the second dielectric substrate, and a first radiation portion on the first dielectric substrate; the filtering unit is arranged on a side of the second dielectric substrate away from the first dielectric substrate; the first phase adjusting structure is electrically connected to the first radiation portion, and configured to adjust a phase of the electromagnetic wave of the first frequency band received by the first radiation portion, and radiate the phase-shifted electromagnetic wave through the first radiation portion; and each second sub-array includes a third dielectric substrate and a fourth dielectric substrate opposite to each other, a second phase adjusting structure between the third dielectric substrate and the fourth dielectric substrate, a second radiation portion on the third dielectric substrate, and a reference electrode layer on a side of the fourth dielectric substrate away from the third dielectric substrate; the third dielectric substrate is on a side of the filtering unit away from the second dielectric substrate; the second phase adjusting structure is electrically connected to the second radiation portion, and configured to adjust a phase of the electromagnetic wave of the second frequency band received by the second radiation portion, and radiate the phase-shifted electromagnetic wave through the second radiation portion.

In some embodiments, orthographic projections of the at least one first sub-array and the at least one second sub-array on a plane where the filtering unit is located do not overlap with each other.

In some embodiments, the at least one first sub-array includes a plurality of first sub-arrays and the at least one second sub-array includes a plurality of second sub-arrays; and the number of the plurality of first sub-arrays is larger than the number of the plurality of second sub-arrays; the plurality of first sub-arrays and the plurality of second sub-arrays are arranged in an array, and an orthographic projection of one second sub-array on a plane where the filtering unit is located covers an orthographic projection of one or more first sub-arrays on the plane where the filtering unit is located.

In some embodiments, the first phase adjusting structure includes a first feed portion and a first phase shifting portion electrically connected to the first feed portion, and the first feed portion is electrically connected to the first radiation portion; the first phase shifting portion includes a first electrode layer on a side of the first dielectric substrate close to the second dielectric substrate, a second electrode layer on a side of the second dielectric substrate close to the first dielectric substrate, and a first tunable dielectric layer between the first electrode layer and the second electrode layer.

In some embodiments, each first sub-array further includes a first driving signal line electrically connected to the first electrode layer and a second driving signal line electrically connected to the second electrode layer.

In some embodiments, for each first sub-array, the first radiation portion is on a side of the first dielectric substrate away from the first phase adjusting structure, and the first radiation portion is electrically connected to the first feed portion through a first via penetrating through the first dielectric substrate.

In some embodiments, for each first sub-array, the first radiation portion is on a side of the first dielectric substrate away from the first phase adjusting structure, and orthographic projections of the first radiation portion and the first feed portion on the first dielectric substrate at least partially overlap with each other.

In some embodiments, the second phase adjusting structure includes a second feed portion and a second phase shifting portion electrically connected to the second feed portion, and the second feed portion is electrically connected to the second radiation portion; the second phase shifting portion includes a third electrode layer on a side of the third dielectric substrate close to the fourth dielectric substrate, a fourth electrode layer on a side of the fourth dielectric substrate close to the third dielectric substrate, and a second tunable dielectric layer between the third electrode layer and the fourth electrode layer.

In some embodiments, each second sub-array further includes a third driving signal line electrically connected to the third electrode layer and a fourth driving signal line electrically connected to the fourth electrode layer.

In some embodiments, for each second sub-array, the second radiation portion is on a side of the third dielectric substrate away from the second phase adjusting structure, and the second radiation portion is electrically connected to the second feed portion through a second via penetrating through the third dielectric substrate.

In some embodiments, for each second sub-array, the second radiation portion is on a side of the third dielectric substrate away from the second phase adjusting structure, and orthographic projections of the second radiation portion and the second feed portion on the third dielectric substrate at least partially overlap with each other.

In some embodiments, the at least one first sub-array includes a plurality of first sub-arrays; the plurality of first sub-arrays share the same first dielectric substrate and the same second dielectric substrate; the at least one second sub-array includes a plurality of second sub-arrays; and the plurality of second sub-arrays share the same third dielectric substrate and the same fourth dielectric substrate;

In some embodiments, the reference electrode layer includes a reflection layer.

In some embodiments, the filtering unit includes a plurality of patterning units, and the plurality of patterning units are patches and/or rings.

In a second aspect, an embodiment of the present disclosure provides an electronic device, which includes the dual-frequency antenna in any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Before describing the technical solution of the embodiment of the present disclosure, it should be noted that a filtering unit in the embodiment of the present disclosure includes, but is not limited to, a frequency selective surface. The filtering unit includes the frequency selective surface as an example in the following description.

Figure 1:
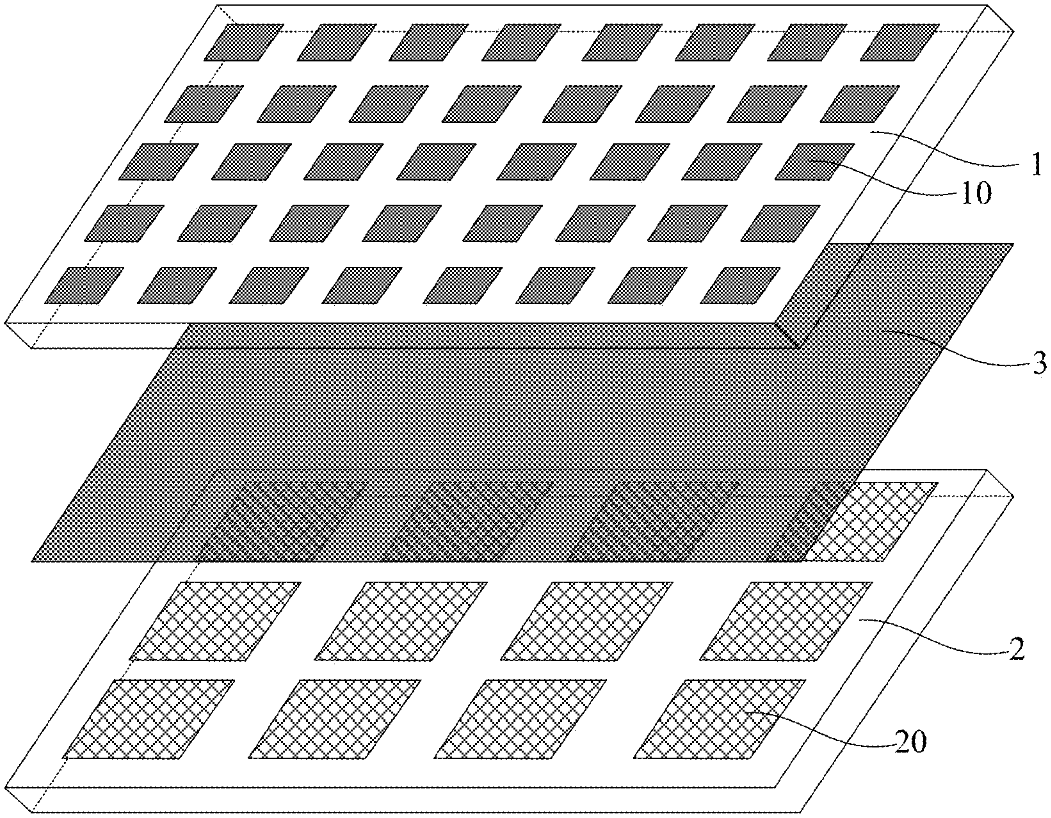
FIG. 1 is a schematic diagram of a structure of a dual-frequency antenna according to an embodiment of the present disclosure.

In a first aspect, FIG. 1 is a schematic diagram of a structure of a dual-frequency antenna according to an embodiment of the present disclosure. As shown in FIG. 1, an embodiment of the present disclosure provides a dual-frequency antenna, including a first antenna unit 1 and a second antenna unit 2 disposed opposite to each other, and a frequency selective surface 3 disposed between the first antenna unit 1 and the second antenna unit 2. An operating frequency of the first antenna unit 1 is within a first frequency band; an operating frequency of the second antenna unit 2 is within a second frequency band. For example: a lowest frequency of the first frequency band is higher than a highest frequency of the second frequency band. That is, relatively speaking, the first frequency band is a high-frequency band, the second frequency band is a low-frequency band, and the corresponding first antenna unit 1 is a high-frequency antenna and the second antenna unit 2 is a low frequency antenna. In the embodiment of the present disclosure, as an example, the first antenna unit 1 is a high-frequency antenna, and the second antenna unit 2 is a low-frequency antenna.

In an embodiment of the present disclosure, the frequency selective surface 3 is configured to reflect an electromagnetic wave of the first frequency band and to transmit an electromagnetic wave of the second frequency band. The first antenna unit 1 is configured to receive an electromagnetic wave of the first frequency band, which is then reflected by the frequency selective surface 3; the second antenna unit 2 is configured to receive an electromagnetic wave of the second frequency band transmitted by the frequency selective surface 3 and to reflect the electromagnetic wave of the second frequency band.

Figure 2:
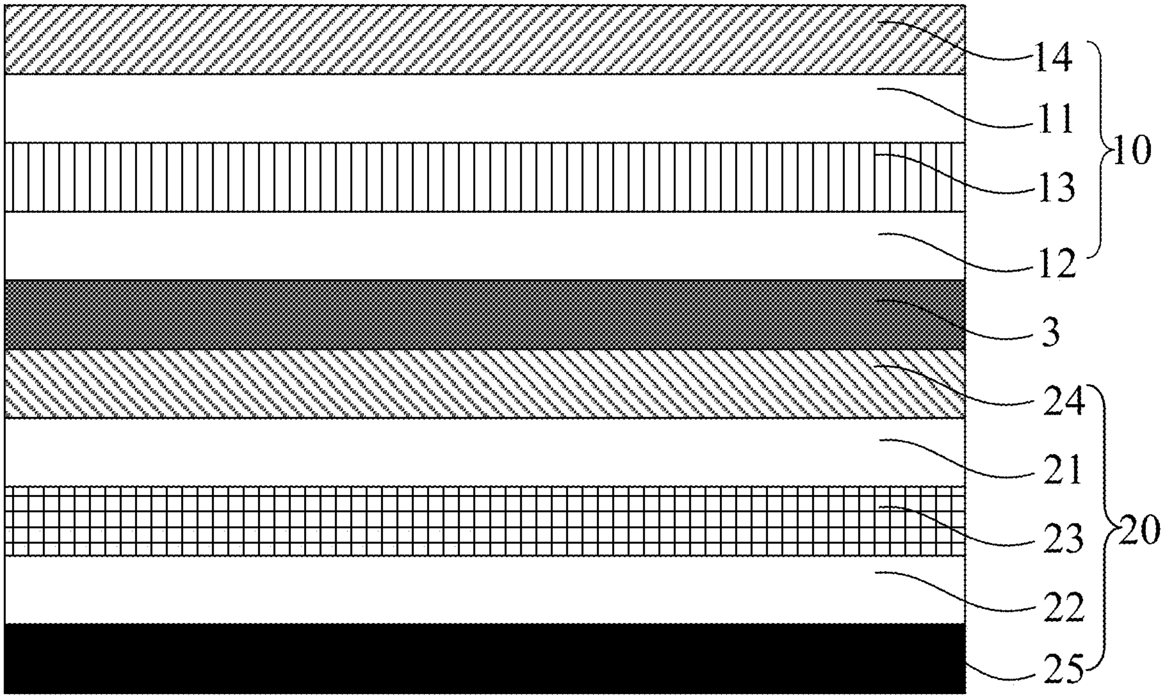
FIG. 2 is a cross-sectional view of a part of a dual-frequency antenna according to an embodiment of the present disclosure.

In the embodiment of the present disclosure, the frequency selective surface 3 is configured to reflect a high-frequency electromagnetic wave and transmit a low-frequency electromagnetic wave, so the frequency selective surface 3 is equivalent to a low pass filter, totally reflects an electromagnetic wave in the high-frequency antenna, serves as a ground layer of the high-frequency antenna, and transmits a low-frequency electromagnetic wave, which does not affect the absorption of the low-frequency antenna on the low-frequency electromagnetic wave, and forms an antenna for realizing beam scanning in the dual-frequency operation. Such an antenna can operate at different frequencies and have a simple structure and a low cost. In some examples, FIG. 2 is a cross-sectional view of a part of a dual-frequency antenna according to an embodiment of the present disclosure. As shown in FIGS. 1 and 2, the first antenna unit 1 includes at least one first sub-array 10. In the embodiment of the present disclosure, the at least one first sub-array 10 includes a plurality of first sub-arrays 10. For example: the first antenna unit 1 includes N×N first sub-arrays 10, where N≥2, and N is an integer. Each sub-array may include a first dielectric substrate 11 and a second dielectric substrate 12 which are oppositely arranged, a first phase adjusting structure 13 arranged between the first dielectric substrate 11 and the second dielectric substrate 12, and a first radiation portion 14 arranged on the first dielectric substrate 11; the first phase adjusting structure 13 is electrically connected to the first radiation portion 14, and the first phase adjusting structure 13 is configured to adjust a phase of the electromagnetic wave of the first frequency band received by the first radiation portion 14, and radiate the phase-shifted electromagnetic wave through the first radiation portion 14.

Further, the frequency selective surface 3 is disposed on a side of the second dielectric substrate 12 close to the second antenna unit 2, and is equivalent to a ground electrode layer of the first antenna unit 1. For example: the frequency selective surface 3 is formed on a side of the second dielectric substrate 12 away from the first phase adjusting structure 13, and the frequency selective surface 3 includes M×M patterning units 31, where the patterning units 31 may be disposed in one-to-one correspondence with the first sub-arrays 10, that is, the number of the patterning units 31 is equal to the number of the first sub-arrays 10 (M=N). Alternatively, the number of patterning units 31 of the frequency selective surface 3 may be different from the number of first sub-arrays 10. For example: multiple first sub-arrays 10 arranged in an array correspond to one patterning unit 31. As another example: one patterning unit 31 corresponds to one first sub-array 10, and the number of the patterning units 31 is greater than that of the first sub-arrays 10.

In some examples, with continued reference to FIGS. 1 and 2, the second antenna unit 2 includes at least one second sub-array 20. In the embodiment of the present disclosure, the at least one second sub-array 20 includes a plurality of second sub-array 20. For example: the second antenna unit 2 includes P×P second sub-array 20, P≥2, and P is an integer. In addition, since in the embodiment of the present disclosure, the first frequency band is a high-frequency band, and the second frequency band is a low-frequency band, a size of each second sub-array 20 is larger than that of each first sub-array 10, and the number of the second sub-arrays 20 is smaller than that of the first sub-arrays 10, that is, P<N. Thus, the number M of the patterning units 31 of the frequency selective surface 3 is not necessarily equal to P. Any second sub-array 20 may include a third dielectric substrate 21 and a fourth dielectric substrate 22 which are oppositely disposed, a second phase adjusting structure 23 disposed between the third dielectric substrate 21 and the fourth dielectric substrate 22, a second radiation portion 24 disposed on the third dielectric substrate 21, and a reference electrode layer 25 disposed on a side of the fourth dielectric substrate 22 away from the second phase adjusting structure 23, the reference electrode layer 25 serving as a reflection layer. The third dielectric substrate 21 is located on the side of the frequency selective surface 3 away from the first antenna unit 1. The second phase adjusting structure 23 is electrically connected to the second radiation portion 24, and configured to shift the phase of the electromagnetic wave of the second frequency band received by the second radiation portion 24, and radiate the phase-shifted electromagnetic wave through the second radiation portion 24. The reference electrode layer 25 includes, but is not limited to, a ground layer, and in the embodiment of the present disclosure, as an example, the reference electrode layer 25 is the ground layer.

In some examples, the first phase adjusting structure 13 and the second phase adjusting structure 23 each may be a phase shifter. For example, to distinguish the first phase adjusting structure 13 from the second phase adjusting structure 23, the phase shifter used as the first phase adjusting structure 13 is referred to as a first phase shifter, and the phase shifter used as the second phase adjusting structure 23 is referred to as a second phase shifter. In an embodiment of the present disclosure, the first phase shifter and the second phase shifter may be a single line phase shifter or a differential double line phase shifter. In the embodiment of the present disclosure, the first phase shifter and the second phase shifter are both differential phase shifters as an example. A first tunable dielectric layer in the first phase shifter and a second tunable dielectric layer in the second phase shifter each include, but are not limited to, a liquid crystal layer. In the embodiment of the present disclosure, as an example, the first tunable dielectric layer and the second tunable dielectric layer are a liquid crystal layer. The liquid crystal layer used as the first tunable dielectric layer is referred to as a first liquid crystal layer 133, and the liquid crystal layer used as the second tunable dielectric layer is referred to as a second liquid crystal layer 233 for convenience of description.

Figure 3:
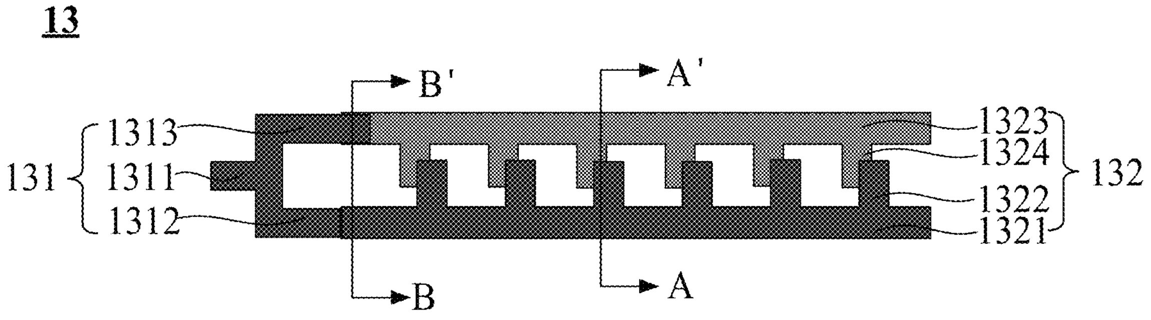
FIG. 3 is a top view of a first phase shifter in a first sub-array according to an embodiment of the present disclosure.
Figure 4:
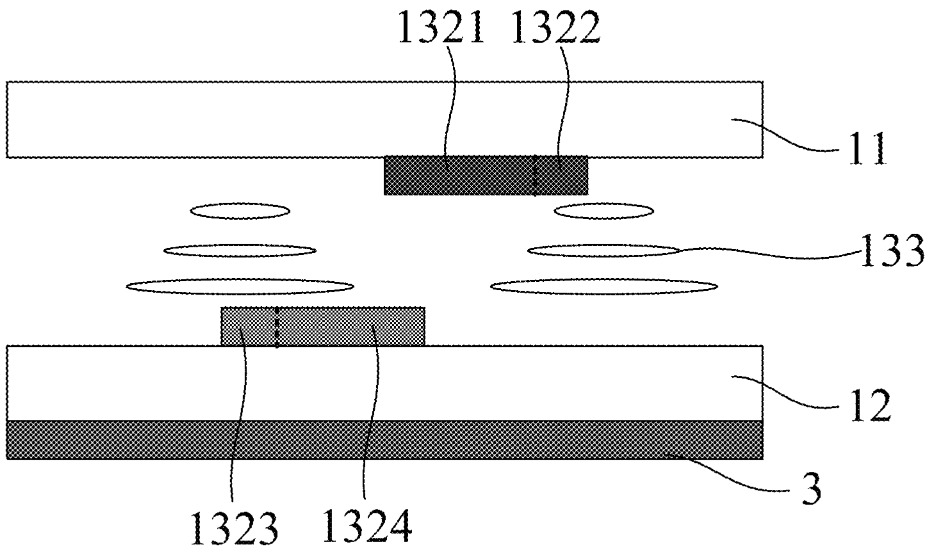
FIG. 4 is a cross-sectional view taken along a line A-A' of FIG. 3.
Figure 5:
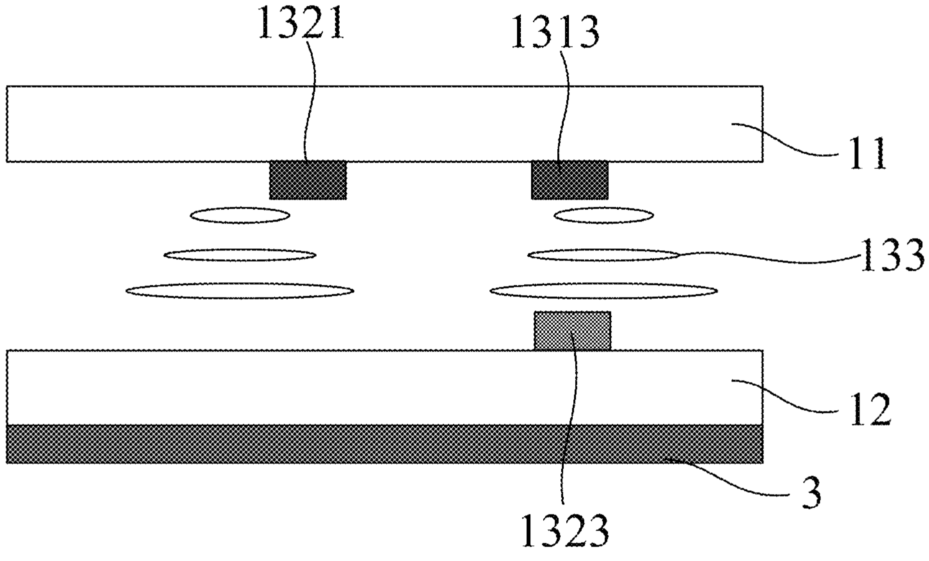
FIG. 5 is a cross-sectional view taken along a line B-B' of FIG. 3.

FIG. 3 is a top view of a first phase shifter in a first sub-array 10 according to an embodiment of the present disclosure. FIG. 4 is a cross-sectional view taken along a line A-A' of FIG. 3. FIG. 5 is a cross-sectional view taken along a line B-B' of FIG. 3. As shown in FIGS. 3 to 5, the first phase shifter includes a first feed portion 131 and a first phase shifting portion 132 electrically connected to the first feed portion 131, and the first feed portion 131 is electrically connected to the first radiation portion 14. The first phase shifting portion 132 includes a first electrode layer disposed on a side of the first dielectric substrate 11 close to the second dielectric substrate 12, a second electrode layer disposed on a side of the second dielectric substrate 12 close to the first dielectric substrate 11, and a first liquid crystal layer 133 disposed between the first electrode layer and the second electrode layer. For example: the first electrode layer includes a first main line 1321 and a plurality of first branches 1322 connected on a side in an extending direction of the first main line 1321 and arranged side by side, and the second electrode layer includes a second main line 1323 and a plurality of second branches 1324 connected on a side in an extending direction of the second main line 1323 and arranged side by side, and orthographic projections of a first branch 1322 and a second branch 1324 corresponding to each other on the first dielectric substrate 11 at least partially overlap with each other. In one example, the first main line 1321 and the second main line 1323 each include first and second ends oppositely disposed; the first feed portion 131 is disposed on the first dielectric substrate 11, and may be a one-two power divider, which includes a first main path 1311 and a first branch path 1312 and a second branch path 1313 connected to the first main path 1311; the first branch path 1312 is directly connected to the first end of the first main line 1321, and the second branch path 1313 is coupled to the first end of the second main line 1323 (i.e., orthographic projection of the second branch path 1313 and the first end of the second main line 1323 on the first dielectric substrate 11 at least partially overlap with each other). The first main path 1311 is electrically connected to the first radiation portion 14. For example: if the first radiation portion 14 is disposed on a side of the first dielectric substrate 11 close to the first liquid crystal layer 133, the first radiation portion 14 is directly electrically connected to the first main path 1311; and if the first radiation portion 14 is disposed on a side of the first dielectric substrate 11 away from the first liquid crystal layer 133, the first radiation portion 14 is electrically connected to the first main path 1311 through a first via penetrating through the first dielectric substrate 11, or the first radiation portion 14 is coupled to the first main path 1311 (that is, orthographic projections of the first radiation portion 14 and the first main path 1311 on the first dielectric substrate 11 at least partially overlap with each other).

Note that both the inputting and outputting of the electromagnetic waves are realized by the first main path 1311 of the first feed portion 131, so it should be understood that matching impedances are provided at both the second end of the first main line 1321 and the second end of the second main line 1323 to reduce transmission loss.

In some examples, when the first antenna unit 1 includes the first phase shifter described above, each first sub-array 10 may include not only the above structure but also a first driving signal line electrically connected to the first electrode layer and a second driving signal line connected to the second electrode layer. For example: the first driving signal line is electrically connected to the first main line 1321, and the second driving signal line is electrically connected to the second main line 1323. A first voltage is applied to the first main line 1321 through the first driving signal line, a second voltage is applied to the second main line 1323 through the second driving signal line, and an electric field is formed between the first branch 1322 and the second branch 1324 corresponding to each other by the first voltage and the second voltage, so that liquid crystal molecules in the first liquid crystal layer 133 are rotated to change a dielectric constant of the first liquid crystal layer 133, thereby realizing the phase shift of the electromagnetic waves. The first driving signal line and the second driving signal line may be respectively disposed on the first dielectric substrate 11 and the second dielectric substrate 12, the second driving signal line disposed on the second dielectric substrate 12 extends to a peripheral region of the second dielectric substrate 12, and is electrically connected to a first lead disposed on the first dielectric substrate 11 through a conductive gold ball, and then the first lead and the first driving signal line are respectively bonded to corresponding connection pads, which are in turn bonded to a printed circuit board integrated with a first driving chip.

Figure 6:
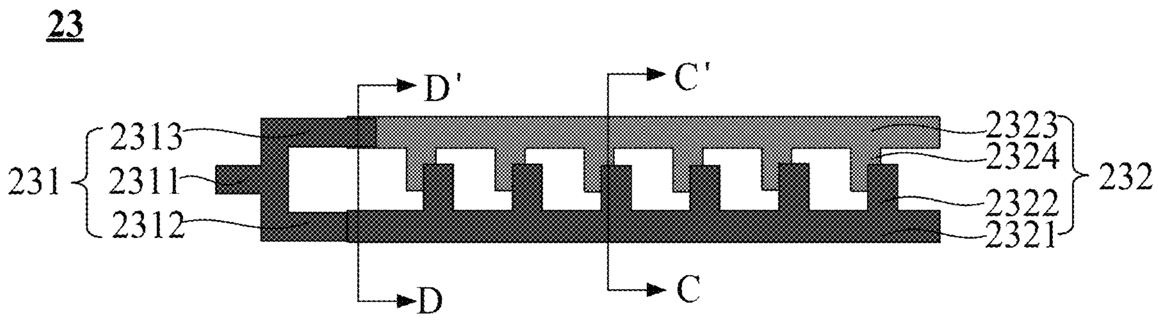
FIG. 6 is a top view of a second phase shifter in a second sub-array according to an embodiment of the present disclosure.
Figure 7:
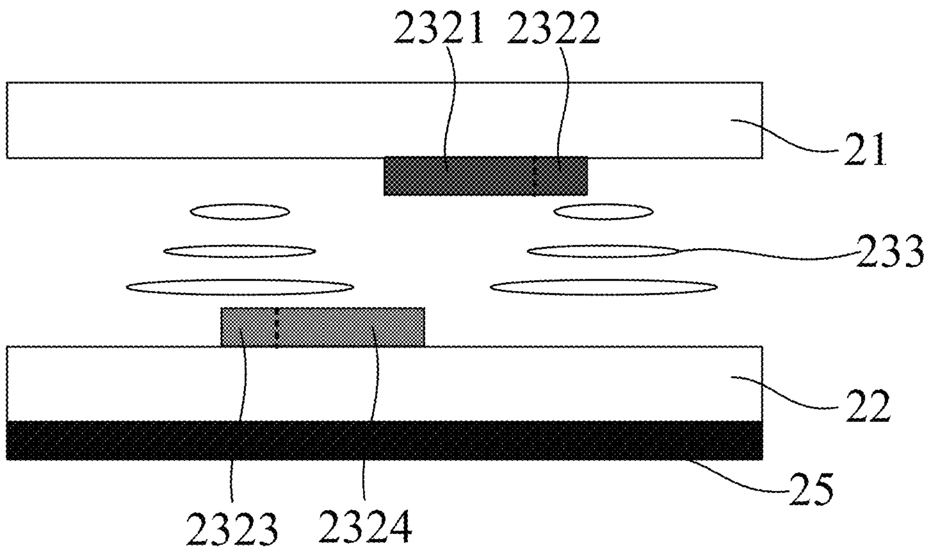
FIG. 7 is a cross-sectional view taken along a line C-C' of FIG. 6.
Figure 8:
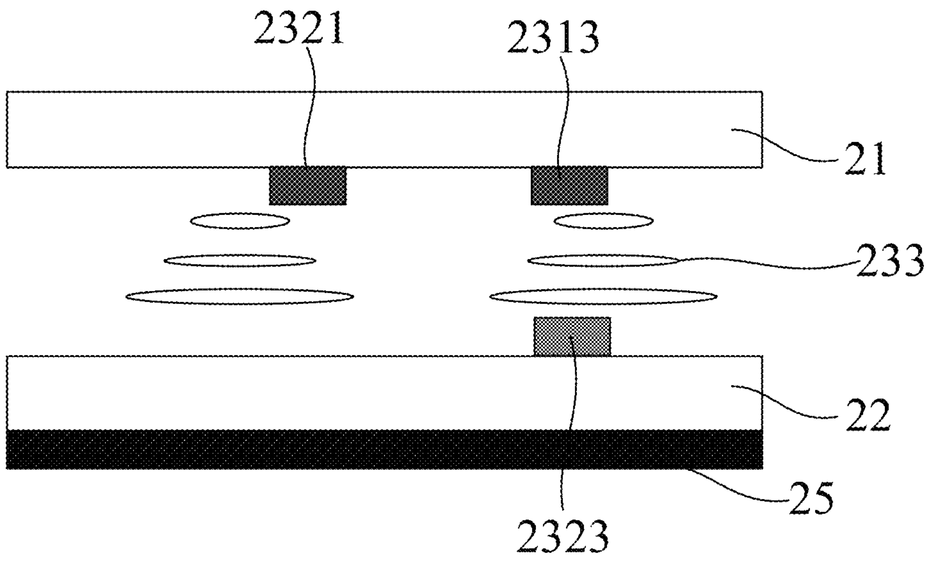
FIG. 8 is a cross-sectional view taken along a line D-D' of FIG. 6.

FIG. 6 is a top view of a second phase shifter in a second sub-array according to an embodiment of the present disclosure. FIG. 7 is a cross-sectional view taken along a line C-C' of FIG. 6. FIG. 8 is a cross-sectional view taken along a line D-D' of FIG. 6. As shown in FIGS. 6 to 8, the second phase shifter includes a second feed portion 231 and a second phase shifting portion 232 electrically connected to the second feed portion 231, and the second feed portion 231 is electrically connected to the second radiation portion 24. The second phase shifting portion 232 includes a third electrode layer disposed on a side of the third dielectric substrate 21 close to the fourth dielectric substrate 22, a fourth electrode layer disposed on a side of the fourth dielectric substrate 22 close to the third dielectric substrate 21, and a second liquid crystal layer 233 disposed between the third electrode layer and the fourth electrode layer. For example: the third electrode layer includes a third main line 2321 and a plurality of third branches 2322 connected on a side in an extending direction of the third main line 2321 and arranged side by side, and the fourth electrode layer includes a fourth main line 2323 and a plurality of fourth branches 2324 connected on a side in an extending direction of the fourth main line 2323 and arranged side by side, and orthographic projections of a third branch 2322 and a fourth branch 2324 corresponding to each other on the third dielectric substrate 21 at least partially overlap with each other. In one example, the third main line 2321 and the fourth main line 2323 each include first and second ends oppositely disposed; the second feed portion 231 is disposed on the third dielectric substrate 21, and may be a one-two power divider, which includes a second main path 2311 and a third branch path 2312 and a fourth branch path 2313 connected to the second main path 2311; the third branch path 2312 is directly connected to the first end of the second main line 2321, and the fourth branch path 2313 is coupled to the first end of the fourth main line 2323 (i.e., orthographic projections of the fourth branch path 2313 and the first end of the fourth main line 2323 on the third dielectric substrate 21 at least partially overlap with each other). The second main path 2311 is electrically connected to the second radiation portion 24. For example: if the second radiation portion 24 is disposed on a side of the third dielectric substrate 21 close to the second liquid crystal layer 233, the second radiation portion 24 is directly electrically connected to the second main path 2311; and if the second radiation portion 24 is disposed on a side of the third dielectric substrate 21 away from the second liquid crystal layer 233, the second radiation portion 24 is electrically connected to the second main path 2311 through a fourth via penetrating through the third dielectric substrate 21, or the second radiation portion 24 is coupled to the second main path 2311 (that is, orthographic projections of the second radiation portion 24 and the second main path 2311 on the third dielectric substrate 21 at least partially overlap with each other).

Note that the electromagnetic wave is input and output by the second main path 2311 of the second feed portion 231, so it should be understood that matching impedances are provided at both the second end of the third main line 2321 and the second end of the fourth main line 2323 to reduce transmission loss. If the second radiation portion 24 is arranged on the side of the third dielectric substrate 21 away from the second liquid crystal layer 233, the frequency selective surface 3 is a conductive structure, so that an insulating layer is arranged between a layer on which the frequency selective surface 3 is located and a layer on which the second radiation portion 24 is located.

In some examples, when the second antenna unit 2 includes the second phase shifter described above, each second sub-array 20 may include not only the above structure but also a third driving signal line electrically connected to the third electrode layer and a fourth driving signal line connected to the fourth electrode layer. For example: the third driving signal line is electrically connected to the third main line 2321, and the fourth driving signal line is electrically connected to the fourth main line 2323. A third voltage is applied to the third main line 2321 through the third driving signal line, a fourth voltage is applied to the fourth main line 2323 through the fourth driving signal line, and an electric field is formed between the third branch 2322 and the fourth branch 2324 corresponding to each other by the third voltage and the fourth voltage, so that liquid crystal molecules in the second liquid crystal layer 233 are rotated to change a dielectric constant of the second liquid crystal layer 233, thereby realizing the phase shift of the electromagnetic waves. The third driving signal line and the fourth driving signal line may be respectively disposed on the third dielectric substrate 21 and the fourth dielectric substrate 22, the fourth driving signal line disposed on the fourth dielectric substrate 22 extends to a peripheral region of the fourth dielectric substrate 22, and is electrically connected to a second lead disposed on the third dielectric substrate 21 through a conductive gold ball, and then the second lead and the third driving signal line are respectively bonded to corresponding connection pads, which are in turn bonded to a printed circuit board integrated with a second driving chip.

It should be noted that only one exemplary structure of the phase shifter is given above, but the phase shifter in the embodiment of the present disclosure is not limited thereto, and various forms of phase shifters may be applied to the antenna in the embodiment of the present disclosure, and are not listed here.

In some examples, sizes of the first radiation portion 14 and the second radiation portion 24 are related to the operating frequencies of the first antenna unit 1 and the second antenna unit 2, and the size (an area) of the second radiation portion 24 is larger than that of the first radiation portion 14. In addition, the sizes of the first radiation portion 14 and the second radiation portion 24 respectively determine the sizes of the first antenna unit 1 and the second antenna unit 2. In drawings of the embodiment of the present disclosure, as an example, an orthographic projection of the first radiation portion 14 on the first dielectric substrate 11 covers an orthographic projection of the first phase adjusting structure 13 on the first dielectric substrate 11, and an orthographic projection of the second radiation portion 24 on the first dielectric substrate 11 covers an orthographic projection of the second phase adjusting structure 23 on the first dielectric substrate 11.

Figure 9:
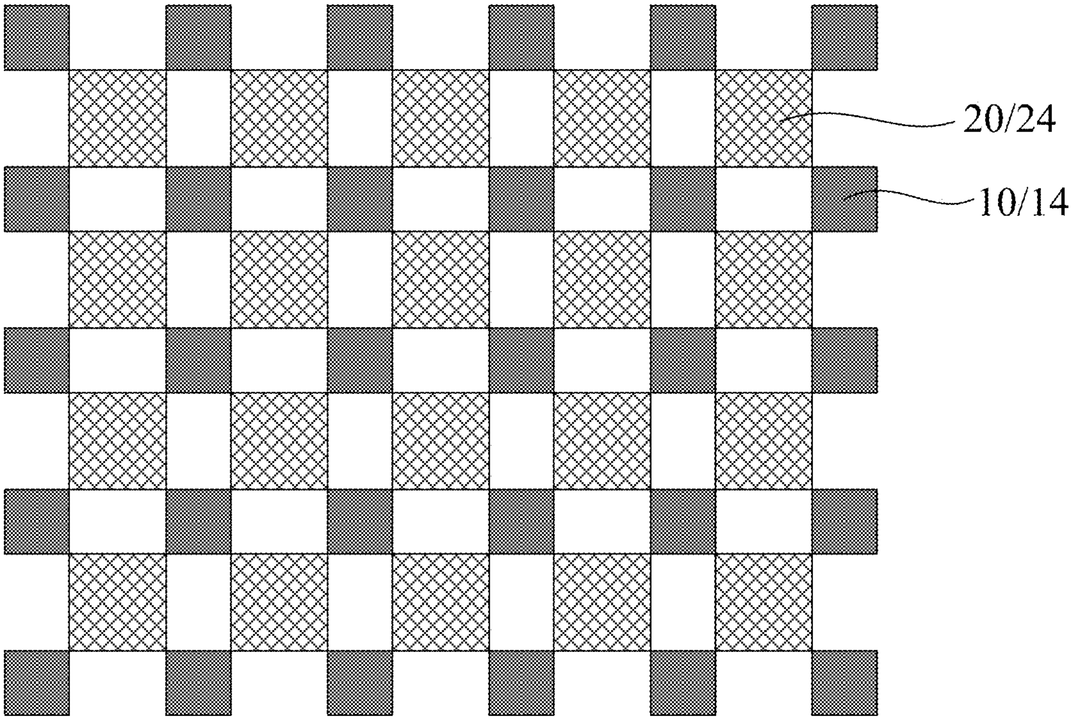
FIG. 9 is a schematic diagram of a correspondence between first sub-arrays and second sub-arrays according to an embodiment of the present disclosure.

Specifically, FIG. 9 is a schematic diagram of a correspondence between a first sub-array 10 and a second sub-array 20 according to an embodiment of the present disclosure. As shown in FIG. 9, when the operating frequencies of the first antenna unit 1 and the second antenna unit 2 are close to each other, a difference between the sizes of the first radiation portion 14 and the second radiation portion 24 is small. At this time, orthographic projections of the first sub-arrays 10 and the second sub-arrays 20 on a plane where the frequency selective surface 3 is located do not overlap with each other. For example: the plurality of first sub-arrays 10 in the first antenna unit 1 form a plurality of first sub-array groups arranged side by side along the second direction, and each first sub-array group includes multiple first sub-arrays 10 arranged side by side along the first direction; the plurality of second sub-arrays 20 in the second antenna unit 2 form a plurality of second sub-array groups arranged side by side along the second direction, and each second sub-array group includes multiple second sub-arrays 20 arranged side by side along the first direction. The first sub-array groups and the second sub-array groups are alternately arranged, and the second sub-arrays 20 and the first sub-arrays 10 are alternately arranged in the first direction.

Figure 10:
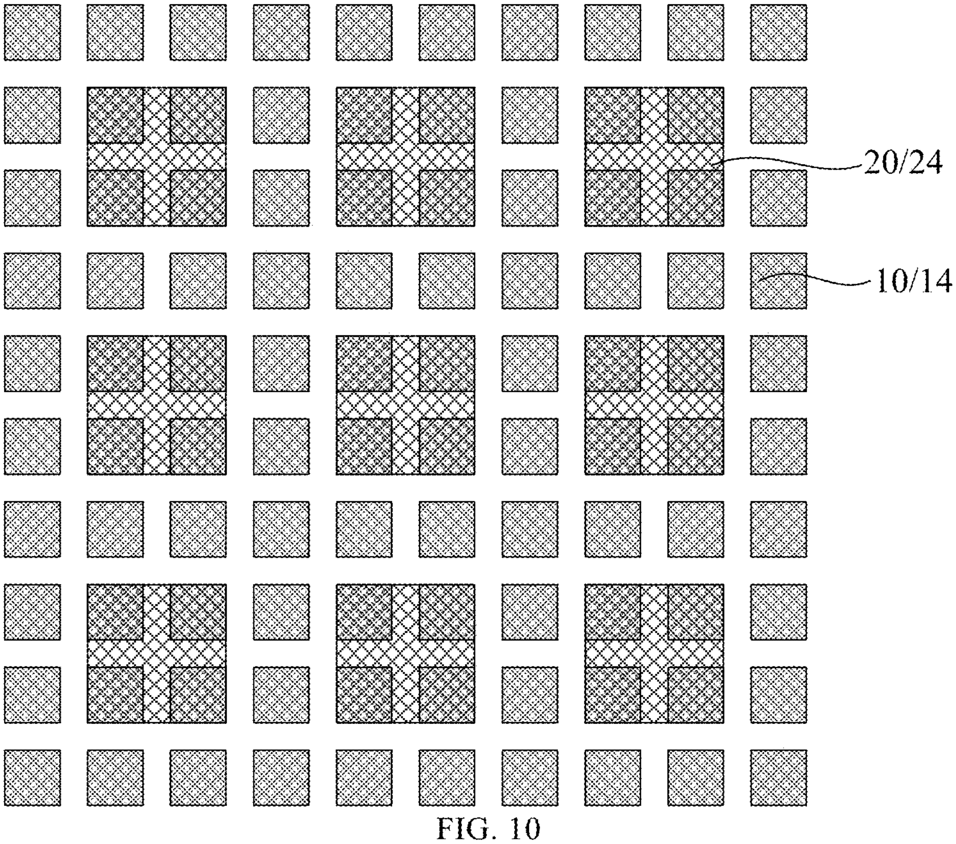
FIG. 10 is a schematic diagram of another correspondence between first sub-arrays and second sub-arrays according to an embodiment of the present disclosure.

FIG. 10 is a schematic diagram of another correspondence between a first sub-array 10 and a second sub-array 20 according to an embodiment of the present disclosure. As shown in FIG. 10, when the operating frequencies of the first antenna unit 1 and the second antenna unit 2 are largely different from each other, an orthographic projection of one second sub-array 20 on the plane where the frequency selective surface 3 is located covers an orthographic projection of the plurality of first sub-arrays 10 arranged in an array on the plane where the frequency selective surface 3 is located. It should be noted that orthographic projections of not all the first sub-arrays 10 on the plane where the frequency selective surface 3 is located are covered by the orthographic projection of the second sub-array 20 on the plane where the frequency selective surface 3 is located. The orthographic projections of the second sub-array 20 and the first sub-array 10 on the plane where the frequency selective surface 3 is located overlap with each other, so that the second radiation portion 24 of each second sub-array 20 is covered by the first radiation portion 14. At this time, the electromagnetic wave radiated by the second radiation portion 24 is further radiated by the coupling of the first radiation portion 14, so that the radiation efficiency of the second antenna unit 2 can be improved, and the transmission loss can be reduced.

In some examples, polarization directions of the first sub-arrays 10 in the first antenna unit 1 may be the same or different, and similarly, polarization directions of the second sub-arrays 20 in the second antenna unit 2 may be the same or different. The polarization direction of the first sub-array 10 in the first antenna unit 1 and the polarization direction of the second sub-array 20 in the second antenna unit 2 may be the same or different. In the embodiment of the present disclosure, according to different application scenarios, one of the first antenna unit 1 and the second antenna unit 2 may be selected to implement a beam scanning function, and the other one is used as a fixed-pointing reflection surface. Alternatively, both the first antenna unit 1 and the second antenna unit 2 may be used for the fixed pointing or may be used to implement the beam scanning.

In some examples, the first sub-arrays 10 in the first antenna unit 1 share the same first dielectric substrate 11 and the same second dielectric substrate 12, and the second sub-array 20 in the second antenna unit 2 share the same third dielectric substrate 21 and the same fourth dielectric substrate 22. In this way, the first antenna unit 1 and the second antenna unit 2 are simple in structure and easy to implement.

Figure 11:
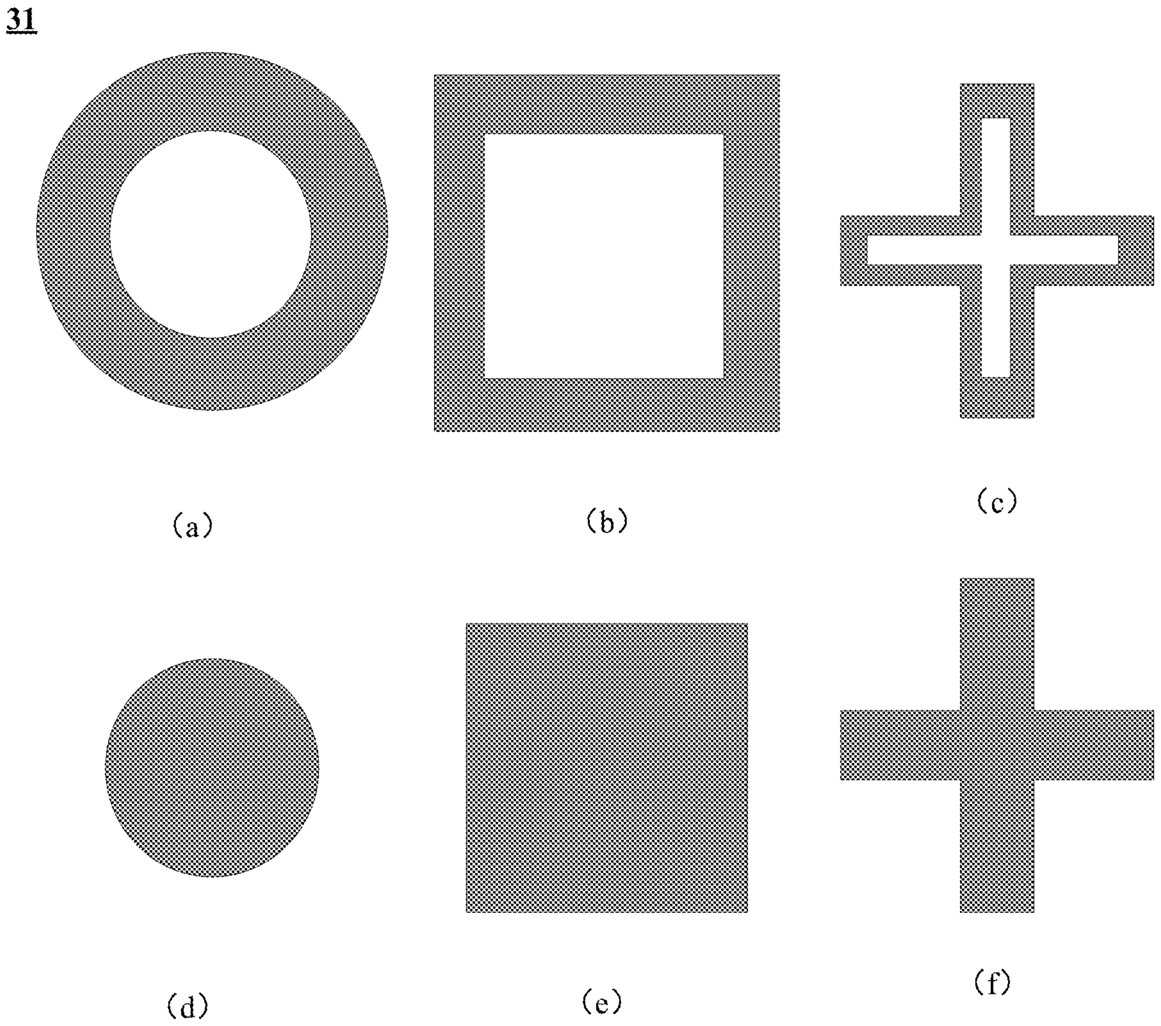
FIG. 11 is a schematic diagram illustrating patterning units selectable for a frequency selective surface of a dual-frequency antenna according to an embodiment of the present disclosure.

In some examples, FIG. 11 is a schematic diagram illustrating patterning units 31 selectable for a frequency selective surface 3 of a dual-frequency antenna according to an embodiment of the present disclosure. As shown in FIG. 11, the frequency selective surface 3 includes a plurality of patterning units 31, each of which is a patch and/or a ring. For example: each patterning unit 31 includes a circular ring (a), a rectangular ring (b), a cross-shaped ring (c), a circular patch (d), a square patch (e), a cross-shaped patch (f), or the like.

In some examples, the first radiation portion 14 and the second radiation portion 24 in the embodiments of the present disclosure may be radiation patches, and the shape of the radiation patches may be rectangular, circular, triangular, octagonal, etc., Alternatively, the first radiation portion 14 and the second radiation portion 24 are not limited to the radiation patches, and may be dipoles or the like. The radiation patches may be selected according to requirements.

In some examples, the first dielectric substrate 11, the second dielectric substrate 12, the third dielectric substrate 21, and the fourth dielectric substrate 22 in the embodiments of the present disclosure each may be a glass substrate, a printed circuit board (PCB), or the like, and a material of the first dielectric substrate 11, the second dielectric substrate 12, the third dielectric substrate 21, or the fourth dielectric substrate 22 is not limited in the embodiments of the present disclosure.

In a second aspect, an embodiment of the present disclosure provides an electronic device which includes the dual-frequency antenna. The electronic device provided in an embodiment of the present disclosure further includes a transceiver unit, a radio frequency transceiver, a signal amplifier, a power amplifier, and a filtering unit. The antenna may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna in the electronic device and is processed by the filtering unit, the power amplifier, the signal amplifier and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the electronic device, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the electronic device, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the electronic device provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A dual-frequency antenna, comprising a first antenna unit and a second antenna unit opposite to each other, and a frequency selective surface between the first antenna unit and the second antenna unit; wherein a frequency which the first antenna unit operates is within a first frequency band; a frequency which the second antenna unit operates is within a second frequency band;

the frequency selective surface is configured to reflect an electromagnetic wave of the first frequency band and to transmit an electromagnetic wave of the second frequency band;

the first antenna unit is configured to receive the electromagnetic wave of the first frequency band, which is then reflected by the frequency selective surface; and the second antenna unit is configured to receive the electromagnetic wave of the second frequency band transmitted by the frequency selective surface and to reflect the electromagnetic wave of the second frequency band;

wherein the first antenna unit comprises at least one first sub-array; the second antenna unit comprises at least one second sub-array;

each first sub-array comprises a first dielectric substrate and a second dielectric substrate opposite to each other, a first phase adjusting structure between the first dielectric substrate and the second dielectric substrate, and a first radiation portion on the first dielectric substrate; the frequency selective surface is arranged on a side of the second dielectric substrate away from the first dielectric substrate; the first phase adjusting structure is electrically connected to the first radiation portion, and configured to adjust a phase of the electromagnetic wave of the first frequency band received by the first radiation portion, and radiate the phase-shifted electromagnetic wave through the first radiation portion; and each second sub-array comprises a third dielectric substrate and a fourth dielectric substrate opposite to each other, a second phase adjusting structure between the third dielectric substrate and the fourth dielectric substrate, a second radiation portion on the third dielectric substrate, and a reference electrode layer on a side of the fourth dielectric substrate away from the third dielectric substrate; the third dielectric substrate is on a side of the frequency selective surface away from the second dielectric substrate; the second phase adjusting structure is electrically connected to the second radiation portion, and configured to adjust a phase of the electromagnetic wave of the second frequency band received by the second radiation portion, and radiate the phase-shifted electromagnetic wave through the second radiation portion.

2. The dual-frequency antenna of claim 1, wherein orthographic projections of the at least one first sub-array and the at least one second sub-array on a plane where the frequency selective surface is located do not overlap with each other.

3. The dual-frequency antenna of claim 2, wherein the first phase adjusting structure comprises a first feed portion and a first phase shifting portion electrically connected to the first feed portion, and the first feed portion is electrically connected to the first radiation portion; the first phase shifting portion comprises a first electrode layer on a side of the first dielectric substrate close to the second dielectric substrate, a second electrode layer on a side of the second dielectric substrate close to the first dielectric substrate, and a first tunable dielectric layer between the first electrode layer and the second electrode layer.

4. The dual-frequency antenna of claim 2, wherein the second phase adjusting structure comprises a second feed portion and a second phase shifting portion electrically connected to the second feed portion, and the second feed portion is electrically connected to the second radiation portion; the second phase shifting portion comprises a third electrode layer on a side of the third dielectric substrate close to the fourth dielectric substrate, a fourth electrode layer on a side of the fourth dielectric substrate close to the third dielectric substrate, and a second tunable dielectric layer between the third electrode layer and the fourth electrode layer.

5. The dual-frequency antenna of claim 1, wherein the at least one first sub-array comprises a plurality of first sub-arrays and the at least one second sub-array comprises a plurality of second sub-arrays; and the number of the plurality of first sub-arrays is larger than the number of the plurality of second sub-arrays; the plurality of first sub-arrays and the plurality of second sub-arrays are arranged in an array, and an orthographic projection of one second sub-array on a plane where the frequency selective surface is located covers an orthographic projection of one or more first sub-arrays on the plane where the frequency selective surface is located.

6. The dual-frequency antenna of claim 5, wherein the first phase adjusting structure comprises a first feed portion and a first phase shifting portion electrically connected to the first feed portion, and the first feed portion is electrically connected to the first radiation portion; the first phase shifting portion comprises a first electrode layer on a side of the first dielectric substrate close to the second dielectric substrate, a second electrode layer on a side of the second dielectric substrate close to the first dielectric substrate, and a first tunable dielectric layer between the first electrode layer and the second electrode layer.

7. The dual-frequency antenna of claim 5, wherein the second phase adjusting structure comprises a second feed portion and a second phase shifting portion electrically connected to the second feed portion, and the second feed portion is electrically connected to the second radiation portion; the second phase shifting portion comprises a third electrode layer on a side of the third dielectric substrate close to the fourth dielectric substrate, a fourth electrode layer on a side of the fourth dielectric substrate close to the third dielectric substrate, and a second tunable dielectric layer between the third electrode layer and the fourth electrode layer.

8. The dual-frequency antenna of claim 1, wherein the first phase adjusting structure comprises a first feed portion and a first phase shifting portion electrically connected to the first feed portion, and the first feed portion is electrically connected to the first radiation portion; the first phase shifting portion comprises a first electrode layer on a side of the first dielectric substrate close to the second dielectric substrate, a second electrode layer on a side of the second dielectric substrate close to the first dielectric substrate, and a first tunable dielectric layer between the first electrode layer and the second electrode layer.

9. The dual-frequency antenna of claim 8, wherein each first sub-array further comprises a first driving signal line electrically connected to the first electrode layer and a second driving signal line electrically connected to the second electrode layer.

10. The dual-frequency antenna of claim 8, wherein for each first sub-array, the first radiation portion is on a side of the first dielectric substrate away from the first phase adjusting structure, and the first radiation portion is electrically connected to the first feed portion through a first via penetrating through the first dielectric substrate.

11. The dual-frequency antenna of claim 8, wherein for each first sub-array, the first radiation portion is on a side of the first dielectric substrate away from the first phase adjusting structure, and orthographic projections of the first radiation portion and the first feed portion on the first dielectric substrate at least partially overlap with each other.

12. The dual-frequency antenna of claim 1, wherein the second phase adjusting structure comprises a second feed portion and a second phase shifting portion electrically connected to the second feed portion, and the second feed portion is electrically connected to the second radiation portion; the second phase shifting portion comprises a third electrode layer on a side of the third dielectric substrate close to the fourth dielectric substrate, a fourth electrode layer on a side of the fourth dielectric substrate close to the third dielectric substrate, and a second tunable dielectric layer between the third electrode layer and the fourth electrode layer.

13. The dual-frequency antenna of claim 12, wherein each second sub-array further comprises a third driving signal line electrically connected to the third electrode layer and a fourth driving signal line electrically connected to the fourth electrode layer.

14. The dual-frequency antenna of claim 12, wherein for each second sub-array, the second radiation portion is on a side of the third dielectric substrate away from the second phase adjusting structure, and the second radiation portion is electrically connected to the second feed portion through a second via penetrating through the third dielectric substrate.

15. The dual-frequency antenna of claim 12, wherein for each second sub-array, the second radiation portion is on a side of the third dielectric substrate away from the second phase adjusting structure, and orthographic projections of the second radiation portion and the second feed portion on the third dielectric substrate at least partially overlap with each other.

16. The dual-frequency antenna of claim 1, wherein the at least one first sub-array comprises a plurality of first sub-arrays; the plurality of first sub-arrays share the same first dielectric substrate and the same second dielectric substrate; the at least one second sub-array comprises a plurality of second sub-arrays; and the plurality of second sub-arrays share the same third dielectric substrate and the same fourth dielectric substrate.

17. The dual-frequency antenna of claim 1, wherein the reference electrode layer comprises a reflection layer.

18. The dual-frequency antenna of claim 1, wherein the frequency selective surface comprises a plurality of patterning units, and the plurality of patterning units are patches and/or rings.

* * * * *